United States Patent
Borkmann et al.

(10) Patent No.: US 9,654,392 B2
(45) Date of Patent: May 16, 2017

(54) MAC ADDRESS PREFIXES USED ON VIRTUAL MACHINE HOSTS

(71) Applicant: Red Hat, Inc., Raleigh, NC (US)

(72) Inventors: Daniel Borkmann, Urdorf (CH); Thomas Graf, Fehraltorf (CH)

(73) Assignee: Red Hat, Inc., Raleigh, NC (US)

( * ) Notice: Subject to any disclaimer, the term of this patent is extended or adjusted under 35 U.S.C. 154(b) by 528 days.

(21) Appl. No.: 14/141,217

(22) Filed: Dec. 26, 2013

(65) Prior Publication Data
US 2015/0186174 A1 Jul. 2, 2015

(51) Int. Cl.
*H04L 12/721* (2013.01)
*G06F 9/455* (2006.01)
*H04L 12/56* (2006.01)

(52) U.S. Cl.
CPC .......... *H04L 45/66* (2013.01); *G06F 9/45558* (2013.01); *G06F 2009/45595* (2013.01); *H04L 45/741* (2013.01)

(58) Field of Classification Search
CPC ....... G06F 9/45558; G06F 2009/45595; H04L 45/66; H04L 45/741
See application file for complete search history.

(56) References Cited

U.S. PATENT DOCUMENTS

| | | | |
|---|---|---|---|
| 7,792,114 B2 * | 9/2010 | Fischer | H04L 29/12009 370/392 |
| 7,822,033 B1 | 10/2010 | Parker et al. | |
| 8,549,187 B1 | 10/2013 | Christopher et al. | |
| 2004/0037214 A1 * | 2/2004 | Blasco Claret | H04B 3/542 370/203 |
| 2004/0088544 A1 * | 5/2004 | Tariq | H04L 63/0435 713/162 |
| 2008/0043665 A1 * | 2/2008 | Jeon | H04W 8/26 370/328 |
| 2010/0232306 A1 * | 9/2010 | Jeon | H04L 12/4625 370/252 |
| 2010/0306358 A1 * | 12/2010 | Droux | G06F 9/45537 709/223 |
| 2012/0014386 A1 * | 1/2012 | Xiong | H04L 29/12028 370/392 |

(Continued)

OTHER PUBLICATIONS

Hao et al., "Enhancing Dynamic Cloud-based Services using Network Virtualization", Bell Labs, Alcatel-Lucent, Published Aug. 17, 2009, http://www1.arl.wustl.edu/~hs1/publication/p37.pdf.

(Continued)

*Primary Examiner* — Jimmy H Tran
(74) *Attorney, Agent, or Firm* — Lowenstein Sandler LLP (57) ABSTRACT

A hypervisor running on a host machine identifies a first media access control (MAC) address prefix associated with the host machine, wherein the first MAC address prefix comprises one or more bits that are shared by MAC addresses for virtual machines hosted by the host machine. The hypervisor configures the host machine to filter packets based on a first MAC address prefix filter, wherein the first MAC address prefix filter passes packets addressed to MAC addresses that have the identified first MAC address prefix. The hypervisor assigns MAC addresses having the first MAC address prefix to a plurality of virtual machines that will be hosted by the host machine.

20 Claims, 8 Drawing Sheets

(56) References Cited

U.S. PATENT DOCUMENTS

| | | | |
|---|---|---|---|
| 2012/0163395 A1 | 6/2012 | Shukla et al. | |
| 2012/0324442 A1 | 12/2012 | Barde | |
| 2013/0016719 A1* | 1/2013 | Johnsen | H04L 12/1863 370/390 |
| 2013/0034109 A1 | 2/2013 | Cardona et al. | |
| 2013/0061047 A1 | 3/2013 | Sridharan et al. | |
| 2013/0152075 A1 | 6/2013 | Cardona et al. | |
| 2013/0198355 A1* | 8/2013 | Kalyanaraman | H04L 67/34 709/223 |
| 2014/0025821 A1* | 1/2014 | Baphna | H04L 61/2061 709/226 |
| 2014/0115135 A1* | 4/2014 | Allan | H04L 67/1004 709/223 |
| 2014/0254611 A1* | 9/2014 | Vavili | H04L 45/745 370/474 |
| 2014/0359089 A1* | 12/2014 | Davis | G06F 15/177 709/221 |
| 2015/0264631 A1* | 9/2015 | Zhang | H04W 48/08 370/329 |

OTHER PUBLICATIONS

Matias et al., "An OpenFlow Based Network Virtualization Framework for the Cloud", Cloud Computing Technology and Science (CloudCom), 2011 IEEE Third International Conference on Nov. 29-Dec. 1, 2011, Published Nov. 29, 2011, http://ieeexplore.ieee.org/xpl/login.jsp?tp=&arnumber=6133213&url=http%3A%2F%2Fieeexplore.ieee.org%2Fxpls%Fabs_all.jsp%3Farnumber=6133213.

Unknown, Addressing Server Virtualization Challenges with Brocade Converged Network Adapters (CNAs) and Brocade Network Advisor, Published 2010, http://www.brocade.com/downloads/documents/technical_briefs/brocade-cnas-virtualized-environments-tb.pdf.

* cited by examiner

MAC ADDRESS PREFIXES USED ON VIRTUAL MACHINE HOSTS

TECHNICAL FIELD

Embodiments of the present invention relate to virtualization, and more specifically to managing the filtering of packets directed to virtual machines.

BACKGROUND

Host machines may host many virtual machines. Each such virtual machine is associated with a different media access control (MAC) address. The network interface controllers (NICs) for host machines are typically placed into a promiscuous mode to enable the host machines to receive packets that are directed to the MAC addresses used by the virtual machines. While a NIC is in the promiscuous mode, the NIC will process and forward all network packets that are received. Accordingly, many network packets that are not relevant to any virtual machine running on the host machine will be received, processed and forwarded on to the virtual switch for still more processing. This can create significant overhead for a NIC and the computer resources used by the virtual switch (e.g., processing resources and/or memory resources).

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for using media access control (MAC) address prefix filters on a host machine to filter packets directed to virtual machines. A network interface controller (NIC) of a host machine is typically placed into a promiscuous mode to enable the NIC to receive network packets that are addressed to MAC addresses used by virtual machines hosted by the host machine. However, this can introduce significant overhead. Such overhead can be excessive in cases where there is a substantial amount of broadcast traffic or non-learnable network traffic (e.g., because a capacity of a switch is not high enough to cover a number of unique flows that are generated by the network). Additionally, NICs typically respond to certain network traffic when in promiscuous mode, but do not respond to such network traffic when not in promiscuous mode. Thus, the promiscuous mode may introduce additional avenues of attack onto the host machine.

Embodiments introduce MAC address prefixes to host machines for managing network traffic. Each host machine is assigned one or a few MAC address prefixes. Each MAC address prefix is a sequence of bits at a front of the MAC address (e.g., the first 3 bytes of the MAC address). Each host machine assigns MAC addresses having the assigned MAC address prefix to virtual machines started on that host machine. Each host machine further includes a MAC address prefix filter that can be used at the hardware level (e.g., by the NIC) or at the software level (e.g., by a virtual switch). The MAC address prefix filter passes packets that are addressed to MAC addresses having the MAC address prefix while filtering out other packets.

Use of the MAC address prefix filters enables a NIC for a host machine to be used in a non-promiscuous mode while still passing through all packets that are addressed to the virtual machines running on the host machine. This can considerably reduce the overhead associated with processing packets at both the NIC level and the network stack level to determine whether those packets are addressed to virtual machines running on the host machine. Additionally, embodiments can increase security of host machines by enabling the NICs to be run in the non-promiscuous mode even when not all of the flows and/or specific MAC addresses associated with virtual machines running on the host machine are known.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some embodiments are described herein with reference to using MAC address prefix filters on NICs. However, it should be appreciated that the principles introduced and described with reference to NICs also apply to software level components such as virtual switches. Accordingly, embodiments of the present invention are not limited to use of MAC address prefix filters in NICs, and those embodiments describing use of MAC address prefix filters in NICs may be modified for use in, for example, virtual switches running on a host machine.

Figure 1:
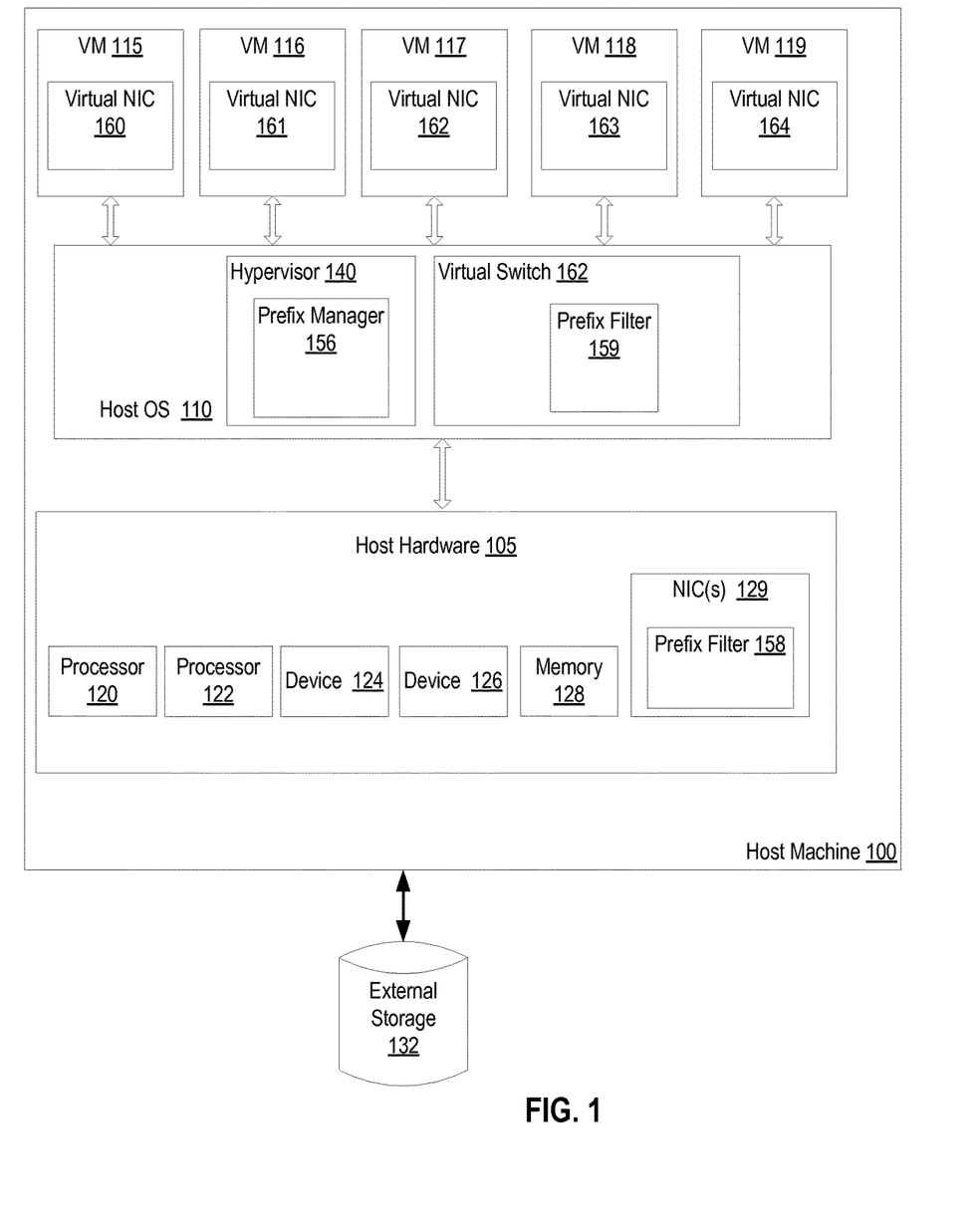
FIG. 1 is a block diagram that illustrates an embodiment of a computer system that hosts one or more virtual machines and a virtual switch.

FIG. 1 is a block diagram that illustrates an embodiment of a computer system (referred to herein as a host machine 100) that hosts one or more virtual machines (VMs) 115-119. The host machine 100 may be a rackmount server, a workstation, a desktop computer, a notebook computer, a tablet computer, a mobile phone, a palm-sized computing device, a personal digital assistant (PDA), etc. The host machine 100 includes host hardware 105, which may include multiple processors 120, 122, multiple devices 124, 126, memory 128, one or more physical network interface controllers (NICs) 129, and other hardware components. The memory 128 may include volatile memory devices (e.g., random access memory (RAM)), non-volatile memory devices (e.g., flash memory), and/or other types of memory devices. The host hardware 105 may also be coupled to external storage 132 via a direct connection or a local network. The host machine 100 may be a single machine or multiple host machines arranged in a cluster.

Each of the devices 124, 126 may be a physical device that is internal or external to the host machine 100. Examples of internal devices include a graphics card, hardware RAID controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 132), external I/O devices, etc.

The NICs 129 may be Ethernet controllers, Wi-Fi controllers, Token Rings, and so forth. The NICs 129 provide functionality to communicate over a network using specific physical layer (OSI layer 1) and data link layer (OSI layer 2) standards (e.g., Ethernet, Wi-Fi, Token Ring, etc.). Each NIC 129 includes a unique media access control (MAC) address, which may be stored in a read only memory of the NIC 129.

The NICs 129 receive data packets (also referred to as network packets or simply packets) that are sent over a network. The data packets may be messages to virtual machines 115-119 running on host machine 100. For example, data packets may be messages from a client to a virtual server. In another example, data packets may be messages sent between different virtual machines. Such virtual machines may be hosted by the same host machine (and managed by the same hypervisor) or hosted by different host machines (and managed by different hypervisors).

The host machine 100 includes a hypervisor 140 (also known as a virtual machine monitor (VMM)). In one embodiment (as shown) hypervisor 140 is a component of a host operating system (OS) 110. Alternatively, the hypervisor 140 may run on top of a host OS 110, or may run directly on host hardware 105 without the use of a host OS 110.

The hypervisor 140 may manage system resources, including access to memory 128, devices 124, 126, NICs 129, secondary storage, and so on. Alternatively, hypervisor 140 may rely on the host OS 110 to manage the system resources. The hypervisor 140, though typically implemented in software, may emulate and export a bare machine interface (host hardware 105) to higher level software. Such higher level software may comprise a standard or real-time operating system (OS), may be a highly stripped down operating environment with limited operating system functionality, may not include traditional OS facilities, etc. The hypervisor 140 presents to other software (i.e., "guest" software) the abstraction of one or more virtual machines (VMs) 115-119, which may provide the same or different abstractions to various guest software (e.g., guest operating system, guest applications, etc.).

The host machine 100 hosts any number of virtual machines (VM) 115-119 (e.g., a single VM, one hundred VMs, etc.). A virtual machine 115-119 is a combination of guest software that uses an underlying emulation of host machine 100 (e.g., as provided by hypervisor 140). Each VM 115-119 may include one or multiple virtual components such as virtual processors, virtual memory, virtual devices (e.g., virtual storage), virtual NICs 160-164, and so forth. Each virtual NIC 160-164 may have one or multiple MAC addresses. Each of these virtual components may map to a hardware component, such as a processor 120, 122, device 124, 126, external storage 132, NIC 129 or memory 128. Virtual machines 115-119 can be, for example, hardware emulation, full virtualization, para-virtualization, and operating system-level virtualization virtual machines. The guest software that runs in a VM 115-119 may include a guest operating system, guest applications, guest device drivers, etc. The virtual machines 115 may have the same or different guest operating systems, such as Windows®, Linux®, Solaris®, etc.

Some virtual machines 115-119 may include guest software that is accessible by clients (e.g., local clients and/or remote clients) to provide services to those clients. For example, VM 115 may include a virtual server such as a virtual web server, a virtual data storage server, a virtual gaming server, a virtual enterprise application server, a virtual voice over internet protocol (VOIP) server, etc. A client may connect to the virtual sever to request one or more services provided by the virtual server.

Similarly, some VMs 115-119 may include a virtual desktop. A virtual desktop is a virtualized desktop computer, and thus may include storage, an operating system, applications installed on the operating system (e.g., word processing applications, spreadsheet applications, email applications, etc.), and so on. However, rather than these functions being provided and performed at a client, they are instead provided and performed by a virtual machine 115-119. A virtual desktop can represent an output (e.g., an image to be displayed) generated by a desktop application running within a virtual machine. Graphics data associated with the virtual desktop can be captured and transmitted to a client, where the virtual desktop may be rendered by a rendering agent and presented by a client application.

Some virtual machines 117-119 may include guest software that performs one or more functions transparently to a virtual server, virtual desktop and/or client. For example, virtual machines 117-119 may include virtual appliances. A virtual appliance may be a virtual machine image file that includes a preconfigured operating system environment and a single application. A virtual appliance may simplify the delivery, setup and operation of that single application. Virtual appliances may be used for deploying network applications, such as firewalls, virtual private networks, wide area network (WAN) optimizers, and so forth.

In one embodiment, the host OS 110 includes a virtual switch 162 that communicates with the hypervisor 140. Alternatively, virtual switch 162 may be a module or daemon that is a component of the hypervisor 140. Additionally, virtual switch 162 may be subdivided into components, in which some components are included in hypervisor 140 and other components are external to hypervisor 140.

The virtual switch may include a routing table with multiple different network traffic flows. Each flow may include various routing information. As used herein, routing information may be any data that is usable for routing packets to a particular location (e.g., to a particular virtual machine). Examples of routing information include a MAC address, a transmission control protocol (TCP) port or universal datagram protocol (UDP) port, a VLAN tag identifying a virtual LAN that a virtual machine is associated with, a tunnel ID, and so forth.

In one embodiment, the virtual switch routes data (e.g., packets received by the NICs 129 to appropriate VMs 115-119 based on matching MAC addresses of the packets MAC addresses of the VMs 115-119. In one embodiment, the virtual switch 102 extracts a flow key from a received packet. The flow key may be a combination of any of the aforementioned routing information that is associated with the packet. The virtual switch may then compare the flow key to a routing table to determine a VM 115-119 to send the packet to.

In one embodiment, the hypervisor 140 includes a prefix manager 156. The prefix manager may keep track of one or more MAC address prefixes that are assigned to the host machine 100. The MAC address prefix may have been assigned, for example, by an orchestration system such as Openstack. In one embodiment, a different MAC address prefix is assigned to each host machine. Alternatively, multiple host machines may use the same MAC address prefix and/or multiple MAC address prefixes may be assigned to a single host machine.

The prefix manager 156 configures the host machine to include a MAC address prefix filter 158, 159 at one or both of a hardware level and a software level. In one embodiment, prefix manager 156 configures one or more NICs 129 of the host machine 100 to include the MAC address prefix filter 158. Once the NICs 129 are configured to include the MAC address prefix filter, a promiscuous mode can be turned off on those NICs 129. With MAC address prefix filters in use, a NIC 129 will pass all packets that are addressed to either the MAC address of the NIC 129 or to any MAC address having a particular MAC address prefix. The MAC address prefix may be a first sequence of bits in a MAC address. For example, the MAC address prefix may be the first 4-10 bits in a MAC address, the first 3 bytes of a MAC address, and so on. The NICs 129 may pass such packets even if the NICs 129 have no information about specific MAC addresses to which packets are addressed. This can significantly reduce an overhead typically introduced by using NICs 129 in a promiscuous mode.

In some instances the NICs 129 may not have a filtering capability or may not be configurable to implement MAC address prefix filters. For example, the NICs 129 may have a limited number of available hardware filter entries that has been exceeded. In such instances, prefix manager 156 may configure, for example, virtual switch 162 to include prefix filter 159. Prefix filter 159 may perform the same filtering operations as described with reference to prefix filter 158. However, prefix filter 159 is implemented at a software level rather than a hardware level.

Each virtual machine 115-119 may include a virtual NIC 160-164 having a different MAC address. When a VM is started or is to be started, hypervisor 140 may assign a MAC address to the virtual NIC 160-164 of that VM 115-119. Prefix manager 156 may direct the hypervisor 140 to assign (or may itself assign) MAC addresses having a particular MAC address prefix assigned to the host machine. Thus, each of the VMs 115-119 started by the hypervisor 140 may have the same MAC address prefix. If multiple MAC address prefixes are assigned to the host machine 100, the VMs 115-119 may be assigned MAC addresses with any of the multiple MAC address prefixes. Additionally, when a MAC address of a VM changes, prefix manager 156 may ensure that the new MAC address has the MAC address prefix.

A virtual machine can typically run in a link layer switching mode or a network address translation (NAT) mode. In the link switching mode the virtual machine will receive packets based on the MAC address. Such a virtual machine will receive all transmission control protocol (TCP) and universal datagram protocol (UDP) packets where the destination MAC address matches the MAC address of one of the virtual NICs 160-164. In this scenario, the virtual machine is part of the Ethernet network and visible on a link layer level.

Figure 2:
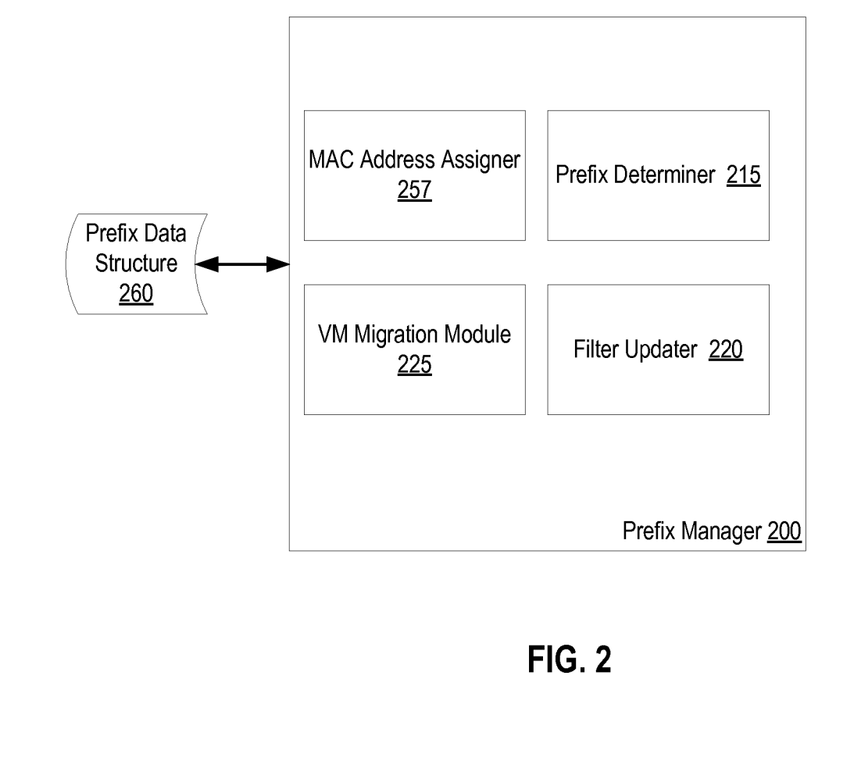
FIG. 2 is a block diagram of a prefix manager, in accordance with one embodiment of the present invention.

FIG. 2 is a block diagram of a prefix manager 200, in accordance with one embodiment of present invention. In one implementation, prefix manager 200 corresponds to prefix manager 156 of FIG. 1. In one embodiment, the prefix manager 200 includes a MAC address assigner 257, a prefix determiner 215, a VM migration module 225 and a filter updater 220. Alternatively, the functionality of one or more of the MAC address assigner 257, prefix determiner 215, VM migration module 225 and filter updater 220 may be combined into a single module or divided into multiple modules.

A host machine on which the prefix manager 200 runs may be assigned one or more MAC address prefixes. Prefix manager 200 may maintain a prefix data structure 260 that identifies each of the MAC address prefixes used by the host machine. The prefix data structure may be a list, table, file, database, or other data structure that identifies MAC address prefixes used by the host machine.

The prefix data structure 260 may contain a separate entry for each MAC address prefix used by virtual machines on the host machine. In some instances virtual machines may be migrated (e.g., failed over) from other host machines to a local host machine on which the prefix manager 200 runs. In such an instance, prefix determiner 215 may review the MAC addresses for the migrated virtual machines and compare these MAC addresses to the prefix data structure 260. If any migrated (e.g., failed over) virtual machine has a MAC address with a MAC address prefix that is not found in the prefix data structure 260, prefix determiner 215 may add an additional entry to the prefix data structure for that MAC address prefix.

When virtual machines are started (or are to be started) on the host machine, MAC address assigner 257 determines one or more MAC address prefixes used on the host machine, and assigns a MAC address having a determined MAC address prefix to that virtual machine. In one embodiment, the prefix data structure 260 includes a preferred MAC address prefix. This may be a MAC address prefix that was assigned to the host machine by, for example, an orchestration system. MAC address assigner 257 in one embodiment assigns MAC addresses having the preferred MAC address prefix to the started virtual machines. Therefore, even if multiple MAC address prefixes are used on the host machine, all new virtual machines will share the same MAC address prefix.

Filter updater 220 may configure one or both of an NIC and a virtual switch with MAC address prefix filters. Each MAC address prefix filter will pass all packets addressed to any MAC address having a particular MAC address prefix, and will filter out all other packets. Any packets that are not passed by a MAC address prefix filter (or that are not directed to a MAC address of the host machine's NIC) may be dropped. A single MAC address prefix filter may pass many different network traffic flows that would otherwise each have had a separate exact match flow entry in a routing table. The MAC address prefix filters may improve a routing speed and reduce lag for both NICs and virtual switches, and may additionally reduce an amount of system resources that are used by virtual switches.

Filter updater 220 may initially configure a NIC or a virtual switch to include a MAC address prefix filter for a MAC address prefix that has been assigned to the host machine. As additional virtual machines are hosted that use new MAC address prefixes (and entries for such MAC address prefixes are added to the prefix data structure 260), filter updater 220 may reconfigure the NIC and/or virtual switch by adding additional MAC address prefix filters for those additional MAC address prefixes to filter tables of the NIC and/or virtual switch. In one embodiment, each MAC address prefix filter is implemented as an entry in a filter table.

VM migration module 225 may determine that one or more virtual machines should be migrated to other host machines based on the MAC addresses of those virtual machines. VM migration module 225 may coordinate with VM migration modules of prefix managers running on the other host machines. Based on such coordination, VM migration module 225 may determine that another host machine is hosting virtual machines having a common MAC address prefix with one or more virtual machines hosted by the local host machine. The VM migration module 225 may flag these one or more virtual machines for migration to the other host machine. A local hypervisor may then perform the migration. This may cause all of the virtual machines that are associated with a particular MAC address prefix to be migrated off of the host machine. Once this occurs, filter updater 220 may reconfigure the NIC and/or virtual switch by removing a MAC address prefix filter corresponding to that particular MAC address prefix. By reducing a number of MAC address prefixes that are used on a host machine, the total number of packets that are unnecessarily processed on that host machine may be reduced. This may improve efficiency and minimize resource utilization both of the NIC and the processing devices on the host machine.

Figure 3:
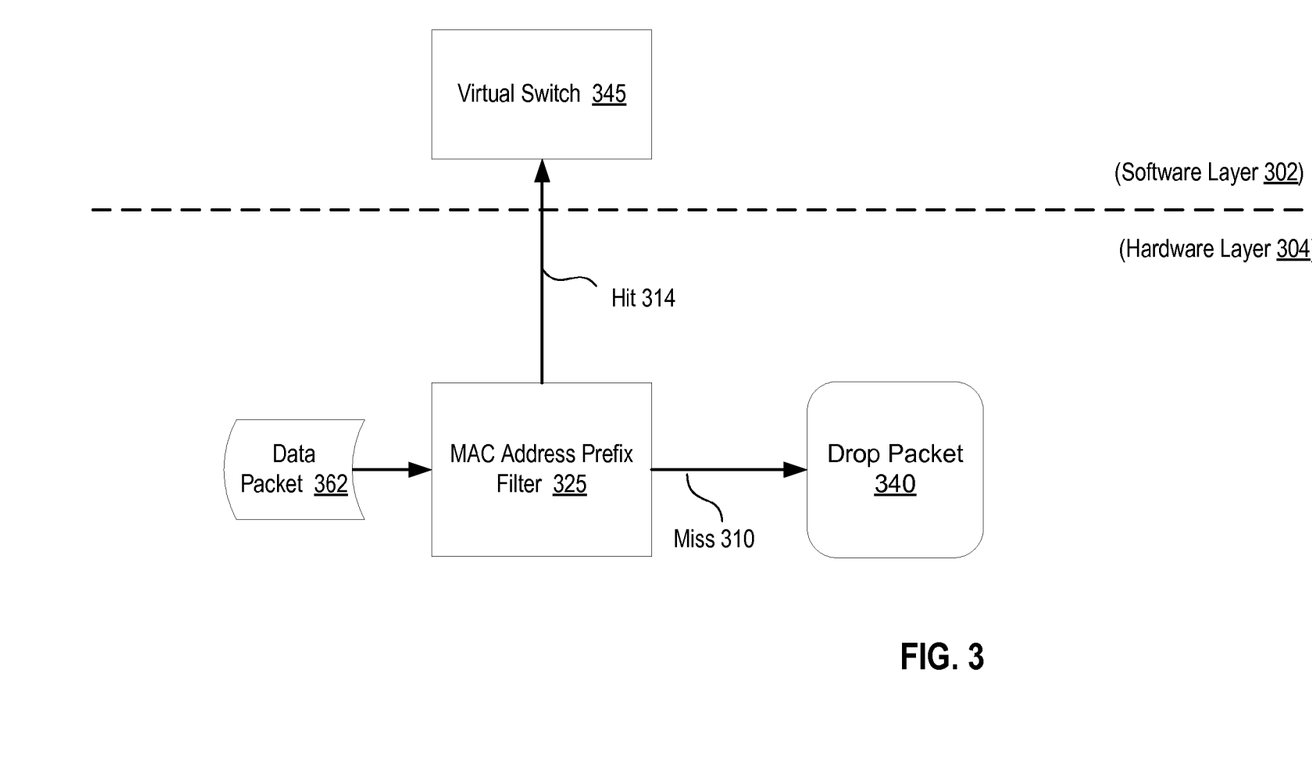
FIG. 3 is a block diagram of a packet filtering process of a network interface controller, in accordance with one embodiment of the present invention.

FIG. 3 is a block diagram of a packet filtering process of a MAC address prefix filter 325, in accordance with one embodiment of the present invention. A data packet 362 is received by a the MAC address prefix filter 325, which may be a hardware layer 304 level filter. If the Data packet is addressed to a MAC address having a MAC address prefix that matches the MAC address prefix filter, a hit 314 is output by that filter. Otherwise, the MAC address prefix filter 325 outputs a miss 310.

Responsive to a hit 314, the data packet 362 is forwarded on to a network stack (e.g., to a virtual switch 345 in a software layer 302). The virtual switch 345 may then determine a particular virtual machine that is associated with the MAC address included in the data packet, and may then forward the packet on to the identified virtual machine. Responsive to a miss 310, the data packet 362 will be dropped unless another filter produced a hit for the data packet.

FIGS. 4-7 are flow diagrams of various embodiments of methods related to the use of MAC address prefix filters by host machines. The methods are performed by processing logic that may include hardware (circuitry, dedicated logic, etc.), software (such as is run on a general purpose computer system or a dedicated machine), or a combination of both. In various implementations some methods may be performed by a network interface controller (NIC). In various implementations some methods are performed by a virtual switch and/or prefix manager running on a host machine, such as virtual switch 162 and/or prefix manager 156 running on host machine 100 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 4:
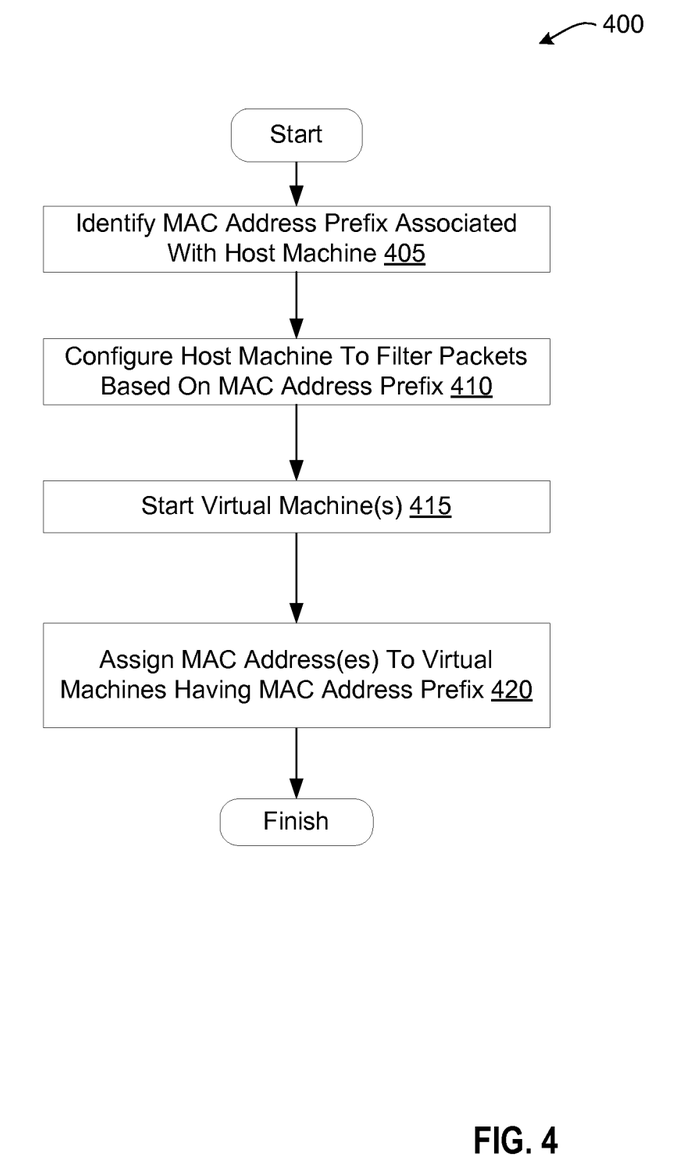
FIG. 4 is a flow diagram illustrating one embodiment for a method of using a MAC address prefix on a host machine.

FIG. 4 is a flow diagram illustrating one embodiment for a method 400 of using a MAC address prefix on a host machine. At block 405 of method 400, processing logic identifies a MAC address prefix associated with a host machine. At block 410, processing logic configures the host machine to filter packets based on the MAC address prefix. This may include adding a MAC address prefix filter for the identified MAC address prefix to a filter or routing table of a NIC and/or a virtual switch.

At block 415, processing logic starts one or more virtual machines. At block 420, processing logic assigns MAC addresses having the identified MAC address prefix to each of the virtual machines. As additional virtual machines are started, these virtual machines may also be assigned MAC addresses that correspond to the MAC address prefix. Additionally, if a MAC address of a virtual machine changes, the new MAC address will also have the MAC address prefix.

Figure 5:
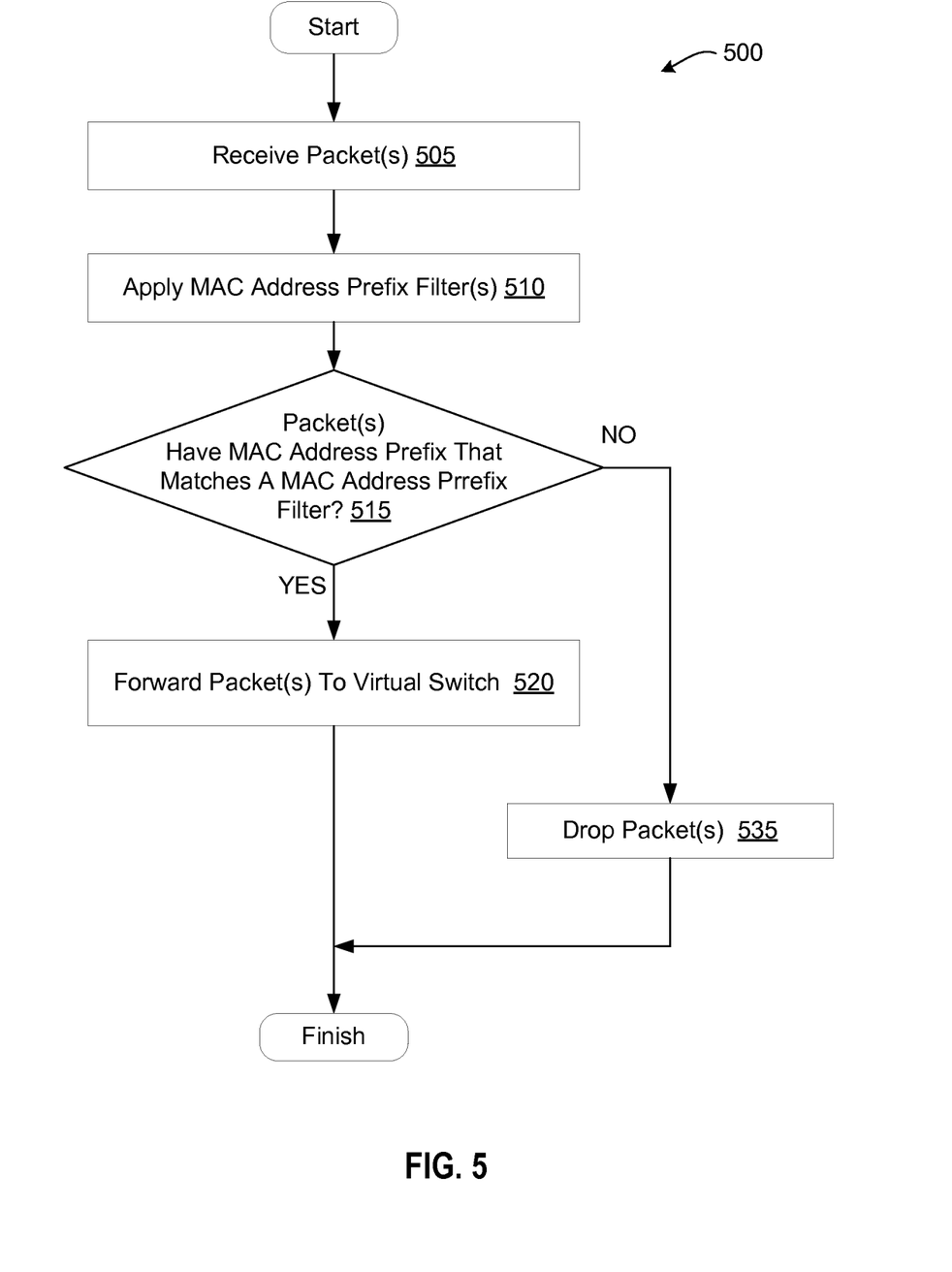
FIG. 5 is a flow diagram illustrating one embodiment for a method of using a MAC address prefix filter on a host machine.

FIG. 5 is a flow diagram illustrating another embodiment for a method 500 of using a MAC address prefix on a host machine. At block 505 of method 500, processing logic receives a packet 505 (or multiple packets). At block 510, processing logic applies one or more MAC address prefix filters to the received packet or packets. At block 515, if the packet satisfies or matches a MAC address prefix filter, the method proceeds to block 520. Otherwise, the method continues to block 535, at which the packet may be dropped.

At block 520, processing logic forwards the packet (or packets) to a virtual switch for further processing.

Figure 6:
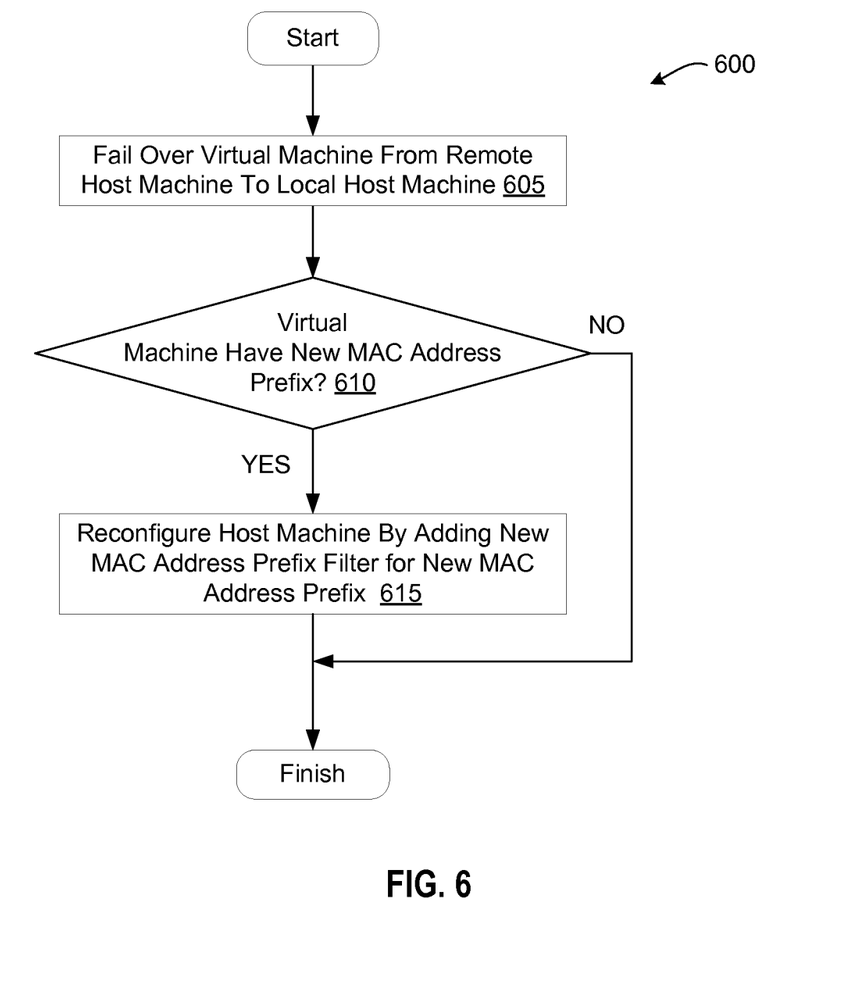
FIG. 6 is a flow diagram illustrating one embodiment for a method of failing over a virtual machine between host machines.

FIG. 6 is a flow diagram illustrating one embodiment for a method 600 of failing over a virtual machine between host machines. At block 605 of method 600 processing logic fails over a virtual machine from a remote host machine to a local host machine. At block 610, processing logic determines whether the failed over virtual machine has a MAC address with a new MAC address prefix. A new MAC address prefix is a MAC address prefix that is not presently used by the host machine. If the failed over virtual machine has a MAC address that does not correspond to any MAC address prefix presently used by the local host, the method continues to block 615. Otherwise the method ends.

At block 615, processing logic reconfigures the local host machine by adding a new MAC address prefix filter for a new MAC address prefix to a NIC and/or a virtual switch of the local host machine. The new MAC address prefix may be a MAC address prefix used by the failed over virtual machine.

Figure 7:
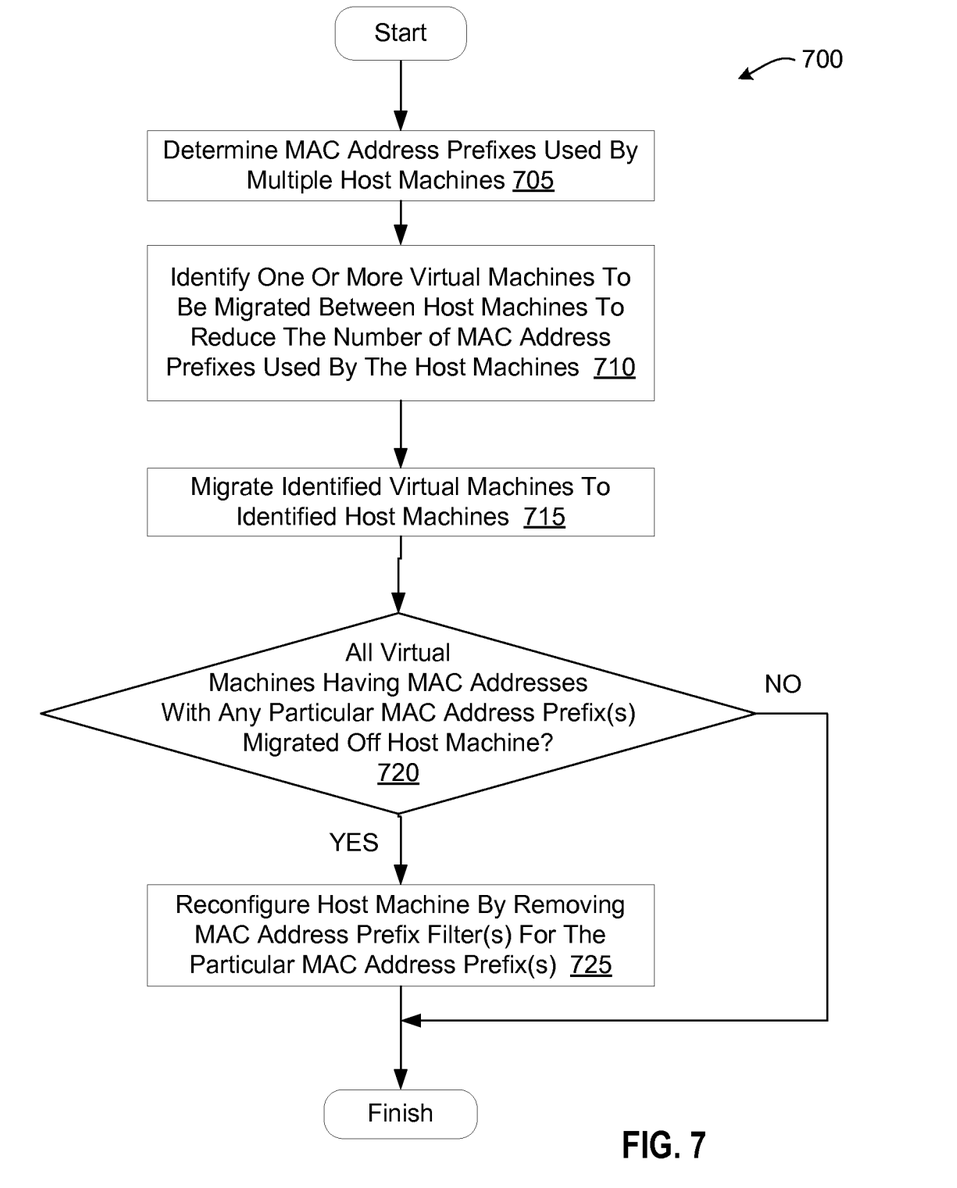
FIG. 7 is a flow diagram illustrating one embodiment for a method of migrating virtual machines between host machines to minimize a number of MAC address prefixes used.

FIG. 7 is a flow diagram illustrating one embodiment for a method 700 of migrating virtual machines between host machines to minimize a number of MAC address prefixes used. At block 705 of method 700, processing logic determines the MAC address prefixes that are in use on a local host machine and on one or more remote host machines. Alternatively, processing logic may determine just the MAC address prefixes used on the local host machine.

At block 710, processing logic identifies one or more virtual machines to be migrated between the host machines in order to reduce the number of MAC address prefixes used by the host machines. For example, processing logic may determine that all virtual machines using a particular MAC address prefix should be migrated off of the local host machine.

At block 715, processing logic migrates the identified virtual machines to the identified host machines. At block 720, processing logic determines whether all virtual machines having MAC addresses with any particular MAC address prefixes have been migrated off the local host machine. If there are no longer any virtual machines that use a particular MAC address prefix on the local host machine, the method continues to block 725. Otherwise the method ends.

At block 725, processing logic reconfigures the local host machine by removing MAC address prefix filters associated with the particular MAC address prefixes that are no longer used. Such MAC address prefix filters may be removed from a NIC and/or a virtual switch.

Figure 8:
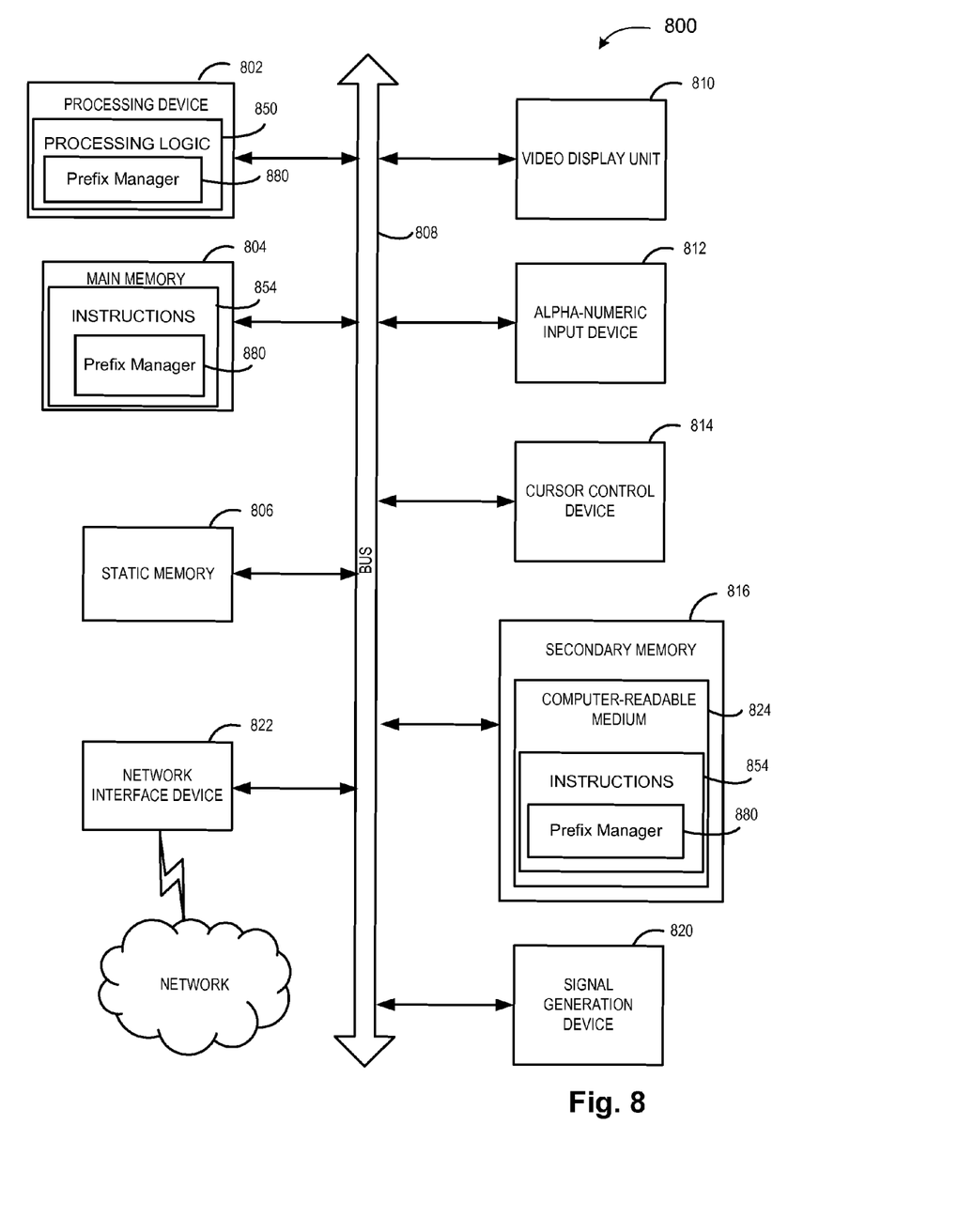
FIG. 8 illustrates a diagrammatic representation of a machine in the exemplary form of a computer system.

FIG. 8 illustrates a diagrammatic representation of a machine in the exemplary form of a computer system 800 within which a set of instructions, for causing the machine to perform any one or more of the methodologies discussed herein, may be executed. The computer system 800 may correspond to host machine 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 816 (e.g., a data storage device), which communicate with each other via a bus 808.

The processing device 802 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 802 may therefore include multiple processors. The processing device 802 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 802 may also be one or more special-purpose processing devices such as an application specific integrated circuit (ASIC), a field programmable gate array (FPGA), a digital signal processor (DSP), network processor, or the like.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The secondary memory 816 may include a machine-readable storage medium (or more specifically a computer-readable storage medium) 824 on which is stored one or more sets of instructions 854 embodying any one or more of the methodologies or functions described herein (e.g., prefix manager 880). The instructions 854 may also reside, completely or at least partially, within the main memory 804 and/or within the processing device 802 during execution thereof by the computer system 800; the main memory 804 and the processing device 802 also constituting machine-readable storage media.

While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid-state memories, and optical and magnetic media.

The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "receiving", "determining", "configuring", "assigning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    identifying, by a hypervisor running on a host machine, a first media access control (MAC) address prefix associated with the host machine, wherein the first MAC address prefix comprises one or more bits that are shared by MAC addresses for virtual machines hosted by the host machine;
    configuring the host machine to filter packets in view of a first MAC address prefix filter, wherein the first MAC address prefix filter passes packets addressed to MAC addresses that have the identified first MAC address prefix;
    assigning, by the hypervisor, MAC addresses having the first MAC address prefix to a plurality of virtual machines that will be hosted by the host machine;
    identifying a new virtual machine that will be migrated to the host machine;
    identifying a second MAC address prefix of the new virtual machine to be associated with the host machine, wherein the second MAC address prefix comprises one or more bits that are to be shared by MAC addresses for virtual machines hosted by the host machine and differs from the first MAC address prefix;
    configuring the host machine to filter packets in view of a second MAC address prefix filter, wherein the second MAC address prefix filter passes packets addressed to MAC addresses that have the identified second MAC address prefix; and
    assigning MAC addresses having the second MAC address prefix to another plurality of virtual machines that will be hosted by the host machine.

2. The method of claim 1, further comprising:
    receiving, by the host machine, a plurality of packets addressed to a plurality of MAC addresses;
    applying the first MAC address prefix filter to the plurality of packets;
    dropping a first subset of the plurality of packets that are addressed to MAC addresses that do not have the first MAC address prefix; and
    forwarding a second subset of the plurality of packets that are addressed to MAC addresses having the first MAC address prefix to a network stack of the host machine.

3. The method of claim 1, wherein configuring the host machine comprises configuring a network interface controller (NIC) of the host machine to implement the first MAC address prefix filter.

4. The method of claim 3, wherein the NIC of the host machine automatically accepts all packets addressed to MAC addresses having the first MAC address prefix without using a promiscuous mode of operation and without having information identifying the plurality of MAC addresses used by the plurality virtual machines.

5. The method of claim 1, wherein configuring the host machine comprises configuring a virtual switch of the host machine to implement the first MAC address prefix filter.

6. The method of claim 1, further comprising:
    failing over a virtual machine from an additional host machine to the host machine, wherein the virtual machine has a MAC address with a third MAC address prefix; and
    configuring the host machine to filter packets in view of a third MAC address prefix filter in addition to the first MAC address prefix filter, wherein the second MAC address prefix filter passes packets addressed to MAC addresses that have the identified third MAC address prefix.

7. The method of claim 1, further comprising:
    identifying one or more virtual machines to be migrated to one or more other host machines in view of MAC address prefixes of MAC addresses used by the one or more virtual machines, the one or more MAC addresses having corresponding alternate MAC address prefixes other than the first MAC address prefix;
    migrating the one or more virtual machines to the one or more other host machines; and
    responsive to determining that all virtual machines having MAC addresses with the corresponding alternate MAC address prefixes have been migrated off of the host machine, updating a configuration of the host machine by removing a corresponding MAC address prefix filter for the corresponding alternate MAC address prefixes from at least one of a network interface controller or a virtual switch.

8. The method of claim 7, wherein the migrating causes each of a plurality of host machines to have a minimum number of different MAC address prefix filters.

9. The method of claim 1, wherein MAC address prefixes comprise a first three bytes of a MAC address.

10. A non-transitory computer readable storage medium having instructions that, when executed by a processing device of a host machine, cause the processing device to:
identify, by a hypervisor running on a host machine, a first media access control (MAC) address prefix associated with the host machine, wherein the first MAC address prefix comprises one or more bits that are shared by MAC addresses for virtual machines hosted by the host machine;
configure the host machine to filter packets in view of a first MAC address prefix filter, wherein the first MAC address prefix filter passes packets addressed to MAC addresses that have the identified first MAC address prefix;
assign, by the hypervisor, MAC addresses having the first MAC address prefix to a plurality of virtual machines that will be hosted by the host machine;
identify a new virtual machine that will be migrated to the host machine;
identify a second MAC address prefix of the new virtual machine to be associated with the host machine, wherein the second MAC address prefix comprises one or more bits that are to be shared by MAC addresses for virtual machines hosted by the host machine and differs from the first MAC address prefix;
configure the host machine to filter packets in view of a second MAC address prefix filter, wherein the second MAC address prefix filter passes packets addressed to MAC addresses that have the identified second MAC address prefix; and
assign MAC addresses having the second MAC address prefix to another plurality of virtual machines that will be hosted by the host machine.

11. The non-transitory computer readable storage medium of claim 10, the processing device further to:
receive, by the host machine, a plurality of packets addressed to a plurality of MAC addresses;
apply the first MAC address prefix filter to the plurality of packets;
drop a first subset of the plurality of packets that are addressed to MAC addresses that do not have the first MAC address prefix; and
forward a second subset of the plurality of packets that are addressed to MAC addresses having the first MAC address prefix to a network stack of the host machine.

12. The non-transitory computer readable storage medium of claim 10, wherein to configure the host machine, the processing device is to configure a network interface controller (NIC) of the host machine to implement the first MAC address prefix filter.

13. The non-transitory computer readable storage medium of claim 12, wherein the NIC of the host machine automatically accepts all packets addressed to MAC addresses having the first MAC address prefix without using a promiscuous mode of operation and without having information identifying the plurality of MAC addresses used by the plurality virtual machines.

14. The non-transitory computer readable storage medium of claim 10, wherein to configure the host machine, the processing device is to configure a virtual switch of the host machine to implement the first MAC address prefix filter.

15. The non-transitory computer readable storage medium of claim 10, where the processing device further to:
fail over a virtual machine from an additional host machine to the host machine, wherein the virtual machine has a MAC address with a third MAC address prefix; and
configure the host machine to filter packets in view of a third MAC address prefix filter in addition to the first MAC address prefix filter, wherein the third MAC address prefix filter passes packets addressed to MAC addresses that have the identified third MAC address prefix.

16. The non-transitory computer readable storage medium of claim 10, where the processing device further to:
identify one or more virtual machines to be migrated to one or more other host machines in view of MAC address prefixes of MAC addresses used by the one or more virtual machines, the one or more MAC addresses having corresponding alternate MAC address prefixes other than the first MAC address prefix;
migrate the one or more virtual machines to the one or more other host machines; and
responsive to determining that all virtual machines having MAC addresses with the corresponding alternate MAC address prefixes have been migrated off of the host machine, updating a configuration of the host machine by removing a corresponding MAC address prefix filter for the corresponding alternate MAC address prefixes from at least one of a network interface controller or a virtual switch.

17. The non-transitory computer readable storage medium of claim 16, wherein to migrate causes each of a plurality of host machines to have a minimum number of different MAC address prefix filters.

18. The non-transitory computer readable storage medium of claim 10, wherein MAC address prefixes comprise a first three bytes of a MAC address.

19. A host machine comprising:
a memory to store instructions for a hypervisor;
a network interface controller (NIC); and
a processing device, operatively coupled to the NIC and to the memory, to execute the instructions for the hypervisor and to:
identify, by a hypervisor running on a host machine, a first media access control (MAC) address prefix associated with the host machine, wherein the first MAC address prefix comprises one or more bits that are shared by MAC addresses for virtual machines hosted by the host machine;
configure the host machine to filter packets in view of a first MAC address prefix filter, wherein the first MAC address prefix filter passes packets addressed to MAC addresses that have the identified first MAC address prefix;
assign, by the hypervisor, MAC addresses having the first MAC address prefix to a plurality of virtual machines that will be hosted by the host machine;
identify a new virtual machine that will be migrated to the host machine;
identify a second MAC address prefix of the new virtual machine to be associated with the host machine, wherein the second MAC address prefix comprises one or more bits that are to be shared by MAC addresses for virtual machines hosted by the host machine and differs from the first MAC address prefix;

configure the host machine to filter packets in view of a second MAC address prefix filter, wherein the second MAC address prefix filter passes packets addressed to MAC addresses that have the identified second MAC address prefix; and assign MAC addresses having the second MAC address prefix to another plurality of virtual machines that will be hosted by the host machine.

20. The host machine of claim 19, wherein the NIC is to:

receive a plurality of packets addressed to a plurality of MAC addresses;

apply the first MAC address prefix filter to the plurality of packets;

drop a first subset of the plurality of packets that are addressed to MAC addresses that do not have the first MAC address prefix; and forward a second subset of the plurality of packets that are addressed to MAC addresses having the first MAC address prefix to the processing device.

* * * * *